(12) United States Patent
Zhai et al.

(10) Patent No.: US 11,890,544 B2
(45) Date of Patent: Feb. 6, 2024

(54) PROP PLACEMENT WITH MACHINE LEARNING

(71) Applicant: Blizzard Entertainment, Inc., Irvine, CA (US)

(72) Inventors: Zhen Zhai, Irvine, CA (US); James Steven Supancic, III, Irvine, CA (US)

(73) Assignee: BLIZZARD ENTERTAINMENT, INC., Irvine, CA (US)

(*) Notice: Subject to any disclaimer, the term of this patent is extended or adjusted under 35 U.S.C. 154(b) by 334 days.

(21) Appl. No.: 17/327,187

(22) Filed: May 21, 2021

(65) Prior Publication Data
US 2022/0203240 A1 Jun. 30, 2022

Related U.S. Application Data

(60) Provisional application No. 63/131,930, filed on Dec. 30, 2020.

(51) Int. Cl.
*A63F 13/00* (2014.01)
*A63F 13/60* (2014.01)
*A63F 13/42* (2014.01)
*A63F 13/55* (2014.01)
*G06N 20/00* (2019.01)

(52) U.S. Cl.
CPC ............ *A63F 13/60* (2014.09); *A63F 13/42* (2014.09); *A63F 13/55* (2014.09); *G06N 20/00* (2019.01)

(58) Field of Classification Search
CPC .......... A63F 13/42; A63F 13/55; A63F 13/60; G06N 20/00
See application file for complete search history.

(56) References Cited

U.S. PATENT DOCUMENTS

| | | | | |
|---|---|---|---|---|
| 5,737,533 A * | 4/1998 | de Hond | ............... | G06F 16/954 709/219 |
| 6,446,261 B1 * | 9/2002 | Rosser | ................. | H04N 21/454 725/35 |
| 6,698,020 B1 * | 2/2004 | Zigmond | ........... | H04N 21/4622 725/139 |
| 7,743,330 B1 * | 6/2010 | Hendricks | .............. | H04H 20/30 715/848 |

(Continued)

*Primary Examiner* — Dmitry Suhol
*Assistant Examiner* — Jason Pinheiro
(74) *Attorney, Agent, or Firm* — Hickman Becker Bingham Ledesma LLP

(57) ABSTRACT

Techniques are described herein for facilitating the placement of props on maps by an automated prop placement tool that makes use of a trained machine learning mechanism. The machine learning mechanism is trained based on one or more training maps upon which props have been placed. The machine learning mechanism may be trained to suggest placement based on (a) spatial rules relating, (b) prop-specific rules, (c) prop-to-fixed-object distances between props and map structures, and (d) distances between props. Once the machine learning mechanism is trained, the prop placement tool may be provided as input (a) map data that defines a target map and (b) prop data that specifies the set of target props to be placed on the target map. Based on this input and the machine learning mechanism's trained model, the prop placement tool outputs a suggested placement, for each of the target props, on the target map.

20 Claims, 23 Drawing Sheets

(56) References Cited

U.S. PATENT DOCUMENTS

| | | | |
|---|---|---|---|
| 7,921,136 B1* | 4/2011 | Shuman | G06T 17/05 |
| | | | 715/201 |
| 8,375,310 B2* | 2/2013 | Hamilton, II | G06Q 90/00 |
| | | | 715/848 |
| 8,893,048 B2* | 11/2014 | Gupta | G06F 30/13 |
| | | | 715/848 |
| 10,226,701 B2* | 3/2019 | Curley | A63F 13/493 |
| 10,529,137 B1* | 1/2020 | Black | G06T 15/04 |
| 10,589,173 B2* | 3/2020 | Kozloski | G06F 16/9537 |
| 10,664,138 B2* | 5/2020 | Carney | H04N 21/6581 |
| 10,854,012 B1* | 12/2020 | Iyer | G02B 27/0093 |
| 10,997,630 B2* | 5/2021 | Pulido | G06T 11/60 |
| 11,348,269 B1* | 5/2022 | Ebrahimi Afrouzi | G01S 17/48 |
| 11,508,169 B2* | 11/2022 | Bala | G06F 18/23213 |
| 11,508,392 B1* | 11/2022 | Sohail | H04M 11/10 |
| 2002/0112249 A1* | 8/2002 | Hendricks | H04H 60/64 |
| | | | 348/E5.103 |
| 2007/0206023 A1* | 9/2007 | Street | A63F 13/10 |
| | | | 345/582 |
| 2014/0267230 A1* | 9/2014 | Osuna | A63F 13/58 |
| | | | 345/419 |
| 2015/0050997 A1* | 2/2015 | Suzman | A63F 13/55 |
| | | | 463/31 |
| 2015/0165310 A1* | 6/2015 | Rebh | A63F 13/60 |
| | | | 463/29 |
| 2016/0332074 A1* | 11/2016 | Marr | A63F 13/60 |
| 2017/0322679 A1* | 11/2017 | Gordon | G06N 20/00 |
| 2018/0013977 A1* | 1/2018 | Martineau | G06V 10/255 |
| 2019/0156485 A1* | 5/2019 | Pfeiffer | G05D 1/0253 |
| 2019/0258737 A1* | 8/2019 | Wang | G01C 21/3848 |
| 2019/0304157 A1* | 10/2019 | Amer | G06V 40/23 |
| 2020/0016499 A1* | 1/2020 | Ryan | G11B 20/10527 |
| 2020/0092590 A1* | 3/2020 | Carpenter | G06Q 30/0269 |
| 2020/0293054 A1* | 9/2020 | George | G06N 20/00 |
| 2020/0320592 A1* | 10/2020 | Soule | G06F 3/013 |
| 2021/0043011 A1* | 2/2021 | Gates | G06F 3/013 |
| 2021/0142526 A1* | 5/2021 | Mantyjarvi | B60W 50/0097 |
| 2021/0178274 A1* | 6/2021 | St-Pierre | G06N 3/047 |
| 2021/0283497 A1* | 9/2021 | Gullicksen | G06T 19/20 |
| 2021/0327112 A1* | 10/2021 | Palmaro | G06T 7/11 |
| 2021/0337284 A1* | 10/2021 | Person | H04N 21/466 |
| 2021/0406575 A1* | 12/2021 | Wiggeshoff | G06V 20/647 |
| 2022/0067984 A1* | 3/2022 | Choi | A63F 13/213 |
| 2022/0096931 A1* | 3/2022 | Raymond | A63F 13/53 |
| 2022/0262060 A1* | 8/2022 | Li | G06F 9/001 |
| 2022/0335720 A1* | 10/2022 | Chang | A63F 13/60 |
| 2023/0021433 A1* | 1/2023 | Sarria, Jr. | G06F 3/017 |
| 2023/0054065 A1* | 2/2023 | Liu | A63F 13/426 |
| 2023/0063052 A1* | 3/2023 | Sohail | H04M 11/025 |

* cited by examiner

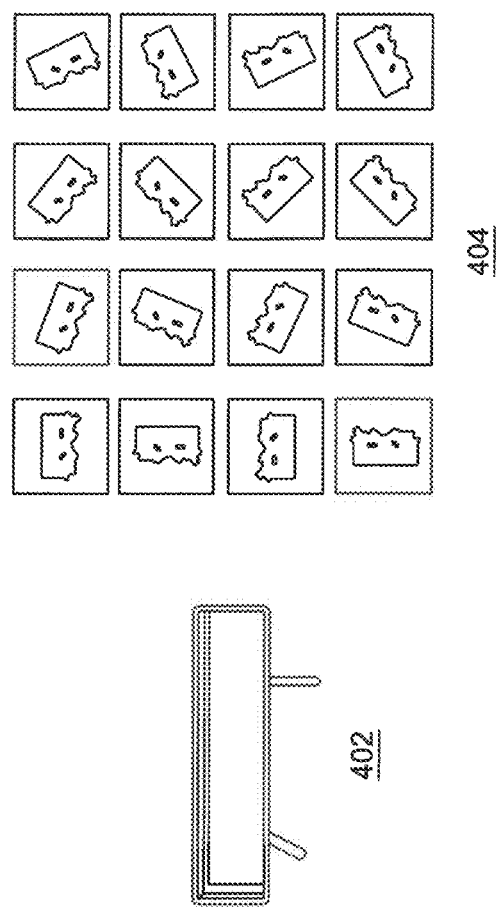
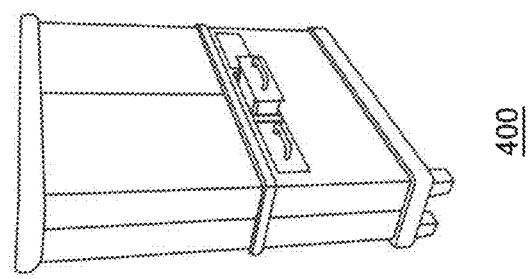
FIG. 4

For $n$ props $(X_1, X_2, \ldots X_n)$ we are placing on location $p$ of the map with $m$ fixed objects $(Y_1, Y_2, \ldots Y_m)$ $$\underline{1302}\ Pr(X_i, p) = \prod_{j=1 \sim m} \underline{1304}\ Pr(X_i, Y_j)\ \prod_{k \neq i} \underline{1306}\ Pr(X_i, X_k)$$

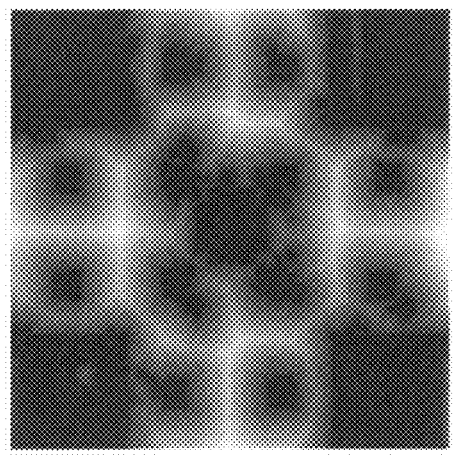
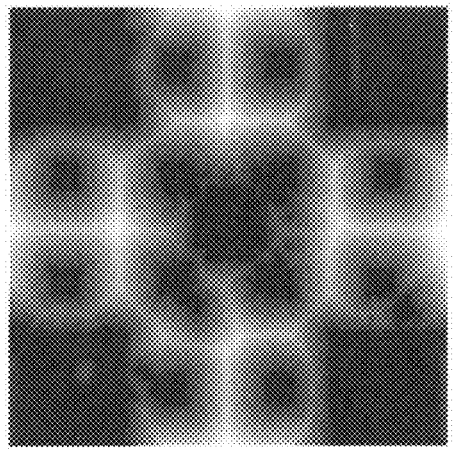
FIG. 15 for $n$ props $(X_1, X_2, \ldots, X_n)$ we are placing on location $p$ of the map with $m$ fixed objects $(Y_1, Y_2, \ldots, Y_m)$ $$s_{i,p} = \sum_{j=1 \sim m} \Pr(X_i, Y_j) + \sum_{k \neq i} \Pr(X_i, X_k)$$

We then normalize $s_{i,p}$ and have $$\Pr(X_i, p) = \frac{s_{i,p} - \min_p(s_{i,p})}{\max_p(s_{i,p}) - \min_p(s_{i,p})}$$

This gives us a looser probability following what we learn from the example.

We want the smaller objects to be placed closer to $Z_i$ comparing to larger objects. Therefore we apply another layer of filtering to the distance function.
$$l = 1 - \frac{Volume(X_i)}{Volume(Scene)}$$
$$Pr(X_i) = \begin{cases} dist_{norm}(X_i, p) & \text{if } dist_{norm}(X_i, p) > l \\ 0 & o.w. \end{cases}$$
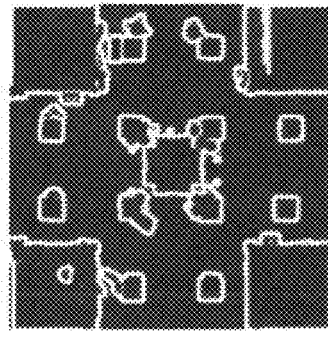
→
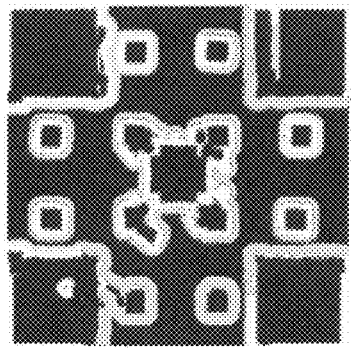
Black(1): non-placeable
White(0): placeable
FIG. 22

PROP PLACEMENT WITH MACHINE LEARNING

CROSS-REFERENCE TO RELATED APPLICATIONS, BENEFIT CLAIM

This application claims the benefit of Provisional Application 63/131,930, filed Dec. 30, 2020, the entire contents of which is hereby incorporated by reference as if fully set forth herein, under 35 U.S.C. § 119(e).

FIELD OF THE INVENTION

The present invention relates to construction of maps in virtual scenes and, more specifically, to automatic placement of props into maps within virtual scenes.

BACKGROUND

Many computer and video games take place within virtual worlds. Similar to the stages of in-person theatrical performances, the scenes of the virtual worlds must be populated with props to properly reflect the environment in which the action takes place. Over time, the size of virtual worlds portrayed in computer and video games has expanded. Currently, computer and video games may have hundreds or even thousands of scenes, where each scene may have dozens of maps, and each map may have dozens of props.

As used herein, there term "map" refers to a portion of a virtual world. A map may be as simple as a flat piece of land, or as complex as the interior of a throne room, with pillars, interior walls, stained glass windows, thrones, wall-mounted torches, stairways, potted plants, etc. As opposed to props, which must be placed within maps, the structures that are built into the maps themselves are referred to herein as "map structures". Referring to FIG. 1, it illustrates a map 100a that includes various map structures, including pillars and walls. Map 100b is the map of 100a to which various props 102 have been added.

The term "scene" refers to a set of related maps. For example, a scene may correspond to a castle in a virtual world, where the maps of that scene correspond to rooms or portions of rooms within the castle. Alternatively, a scene more correspond to a town, where the maps of the scene may correspond to different areas or buildings within the town. The techniques described herein are not limited to any particular types of scenes, or any particular type of relationship between the maps of a scene.

As the size of virtual worlds expand, so does the time required to construct the virtual worlds. For example, for a virtual world that includes 50 scenes, where the scenes have an average of 25 maps, and the maps have an average of 10 props, 12,500 distinct props placements need to be performed. For a virtual world that includes 5000 scenes, the number of prop placements goes to 1,250,000. Clearly, if a skilled graphic artist were to attempt to place each prop by hand under these circumstances, the amount of time consumed by the prop placement task would be enormous. Such manual placement typically includes selecting a location, rotation and alignment for each prop, and then confirming that the prop placements on a map collectively look natural and logical. On the other hand, automating prop placement using simple rules of thumb may result in distracting, ugly and/or unrealistic prop placement decisions. Given the variation among maps and props, it is unlikely that any simple set of rules would produce acceptable results in all situations.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 4 illustrates a prop and possible orientations for the prop;

FIG. 15 illustrates how a distance transform of the target map may be used to determine proximity scores for placements of a prop;

FIG. 22 illustrates distance may be made proportional to the volume of a prop, according to an embodiment.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for facilitating the placement of props on maps by an automated prop placement tool that makes use of a trained machine learning mechanism. The machine learning mechanism is trained based on one or more training maps upon which props have been placed. According to an embodiment, the machine learning mechanism is trained to suggest placement based on (a) spatial rules, (b) prop-specific rules, (c) prop-to-fixed-object distances between props and map structures, and (d) distances between props.

Figure 1:
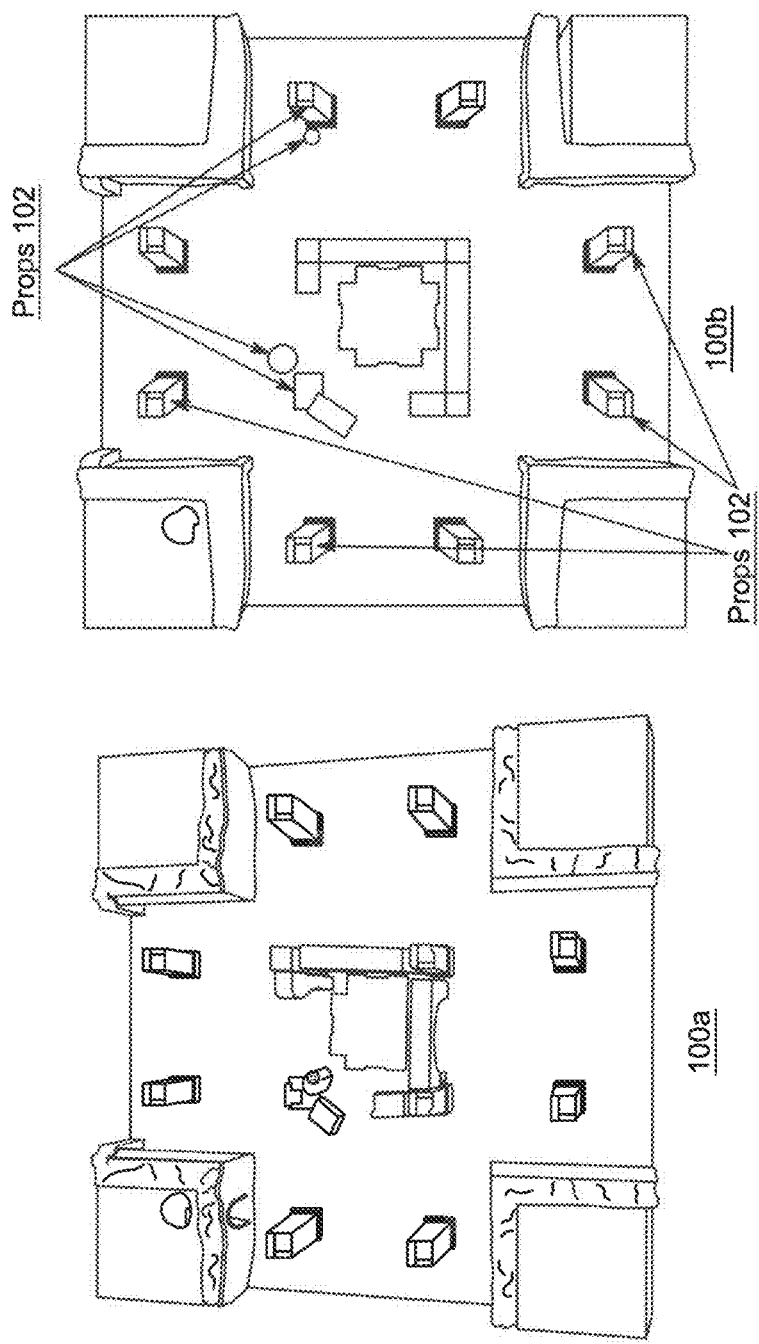
FIG. 1 illustrates a target map without props, and a target map after props have been placed on the target map.
Figure 2:
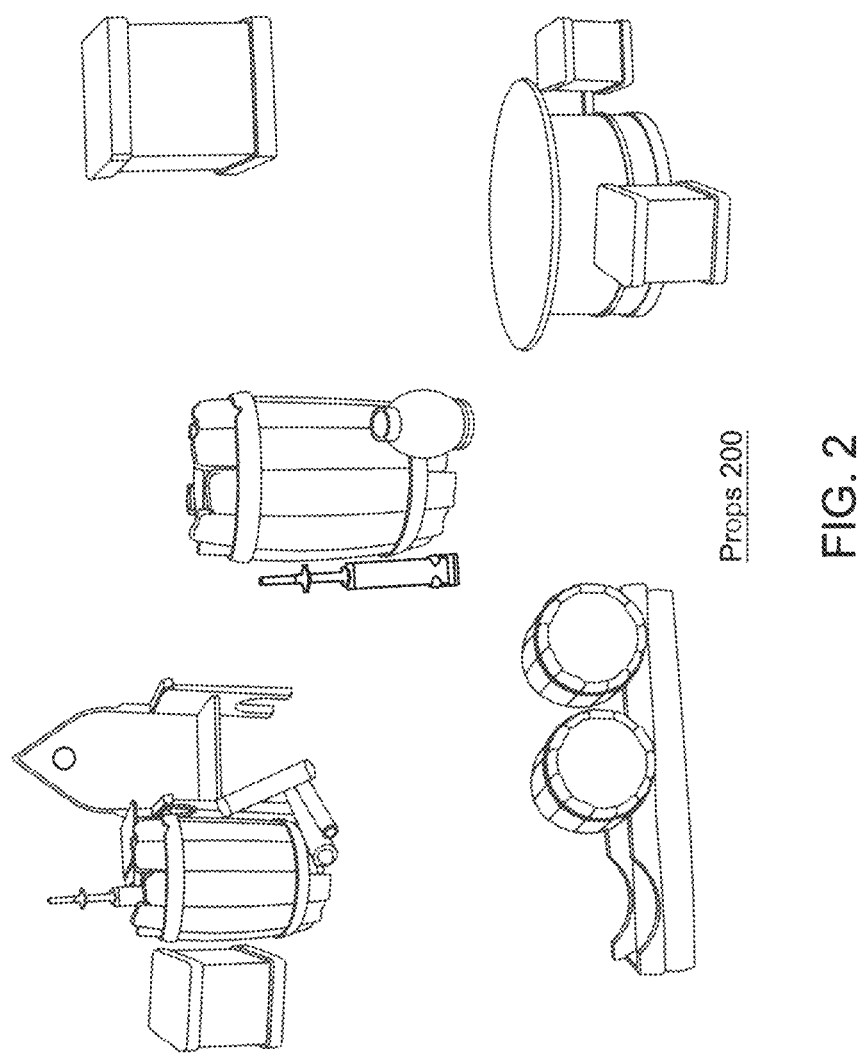
FIG. 2 illustrates a plurality of target props to be placed on a target map.

Once the machine learning mechanism is trained, the prop placement tool may be provided (a) map data that defines a target map (e.g. map 100a in FIG. 1), and (b) prop data that specifies the set of props to be placed on the target map (e.g. the props 200 illustrated in FIG. 2). The set of props to be placed on the target map are collectively referred to herein as the "target props".

Based on this input and the machine learning mechanism's trained model, the prop placement tool outputs a suggested placement, for each of the target props, on the target map (e.g. map 100b in FIG. 1). As used herein, the term "placement" refers to a specific map location. For props whose orientations may affect the desirability of a placement outcome, "placement" refers to a specific (location, orientation) combination.

Map Locations

As mentioned above, the prop placement tool outputs a proposed placement for each of the target props. The "location" of a placement may be fine-grained (e.g. correspond to a single pixel on the target map), or coarse-grained (e.g. correspond to sets of pixels or larger areas on the target map). For the purpose of explanation, an embodiment shall be described in which each location corresponds to a distinct pixel. In such an embodiment, prior to filtering, the number of possible placements for a target prop is equal to the number of pixels on the target map.

Spatial Rules

Initially, every location on a map is considered a candidate location for placement of each target prop at each possible orientation. However, based on a "no-collision" spatial rule that two objects cannot occupy the same space at the same time, the candidate (location, orientation) possibilities for a target prop are culled to remove placements in which the periphery of target prop would intersect/collide with the periphery of a map structure or with the periphery of an already-placed target prop. The no-collision rule is merely one example of a spatial rule that may be applied to cull the initial set of candidate placements for a target prop.

The techniques described herein are not limited to any particular type or number of spatial rules.

Figure 3:
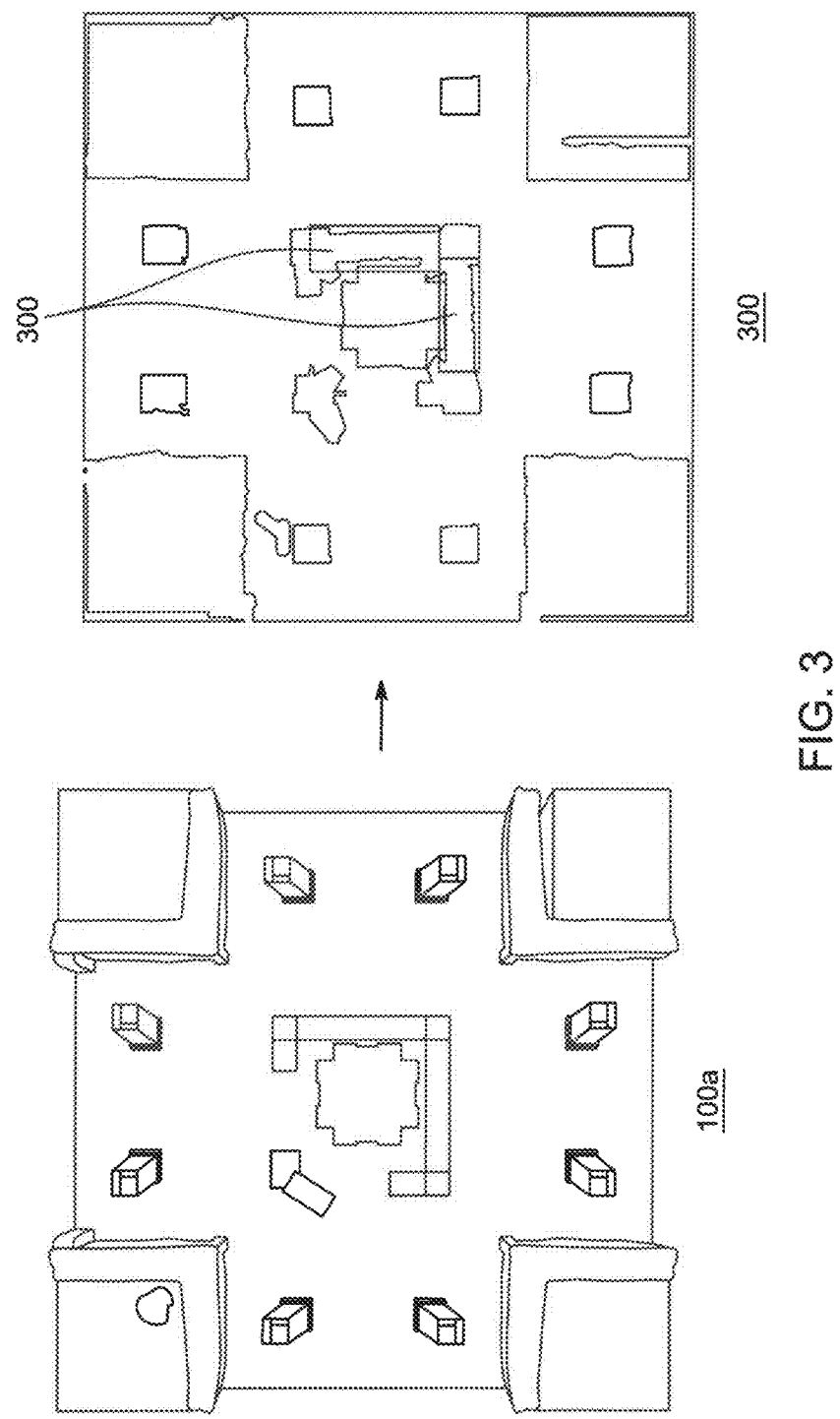
FIG. 3 illustrates how a two-dimensional image may be made from a target map, where the image is used to determine whether placements satisfy one or more spatial rules.

According to one embodiment, placements that violate the no-collision spatial rule are identified by creating a two-dimensional top-down view of the target map, as illustrated in FIG. 3. Referring to FIG. 3, it illustrates a two-dimensional image 300 created from a top-down view of the target map 100a. Once such a map is created, the prop placement tool tests each placement of a target prop to determine whether the placement results in a collision. Any collision detection algorithm may be used for detecting such collisions, and the techniques described herein are not limited to any particular collision detection algorithm.

For the purpose of illustration, it shall be assumed that the target prop under consideration is the cabinet 400 illustrated in FIG. 4. FIG. 4 also illustrates a top-down view 402 of the cabinet, and a two-dimensional top-down view of the cabinet in each of 16 distinct orientations 404. The two-dimensional top-down view of a prop for a given orientation is referred to herein as an orientation-specific-prop-image. To determine which placements for cabinet 400 satisfy the no-collision rule, each of the 16 orientation-specific-prop images 404 are tested at each location on the two-dimensional image 300 of the target map. In embodiments where locations correspond to individual pixels, each of the 16 orientation-specific-prop images 404 will be tested for collisions when placed at each of the pixels in image 300. After culling the placement candidates for cabinet 400 in this manner, the prop placement tool is left with a filtered set of placement candidates for cabinet 400 that satisfy the no-collision spatial rule.

Height-Limited Two-dimensional Images

Figure 5:
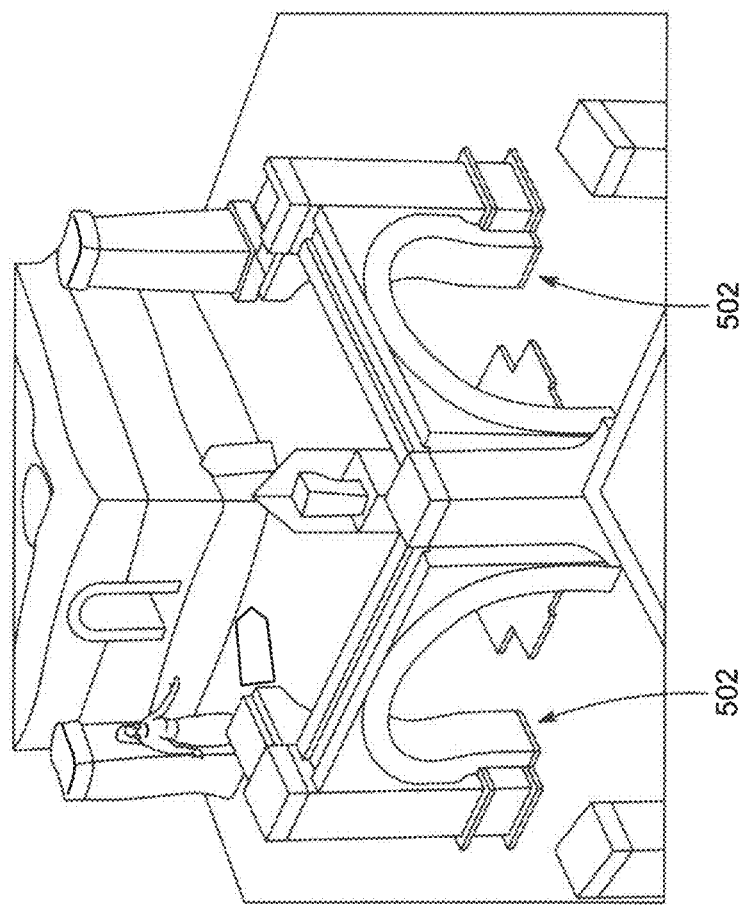
FIG. 5 is a three-dimensional view of a target map that illustrates how some locations that are shown as occupied in a top-down-view may not actually be occupied for the purposes of prop placement.

Unfortunately, filtering based on collisions between the two-dimensional top-down image of a map and orientation-specific prop images may be overly restrictive. Specifically, the two-dimensional top-down image of a map may indicate obstructions that should not limit the placement of objects. For example, referring again to FIG. 3, the two-dimensional top-down image 300 indicates solid obstructions in regions 302. However, inspection of the actual three-dimensional rendering 500 of target map, illustrated in FIG. 5, shows that regions 302 correspond to arches 502. Depending on the height of a target prop, it may be possible to place the target prop in the same two-dimensional location as the arch (e.g. beneath the arch) without the prop violating the no-collision rule.

Figure 6:
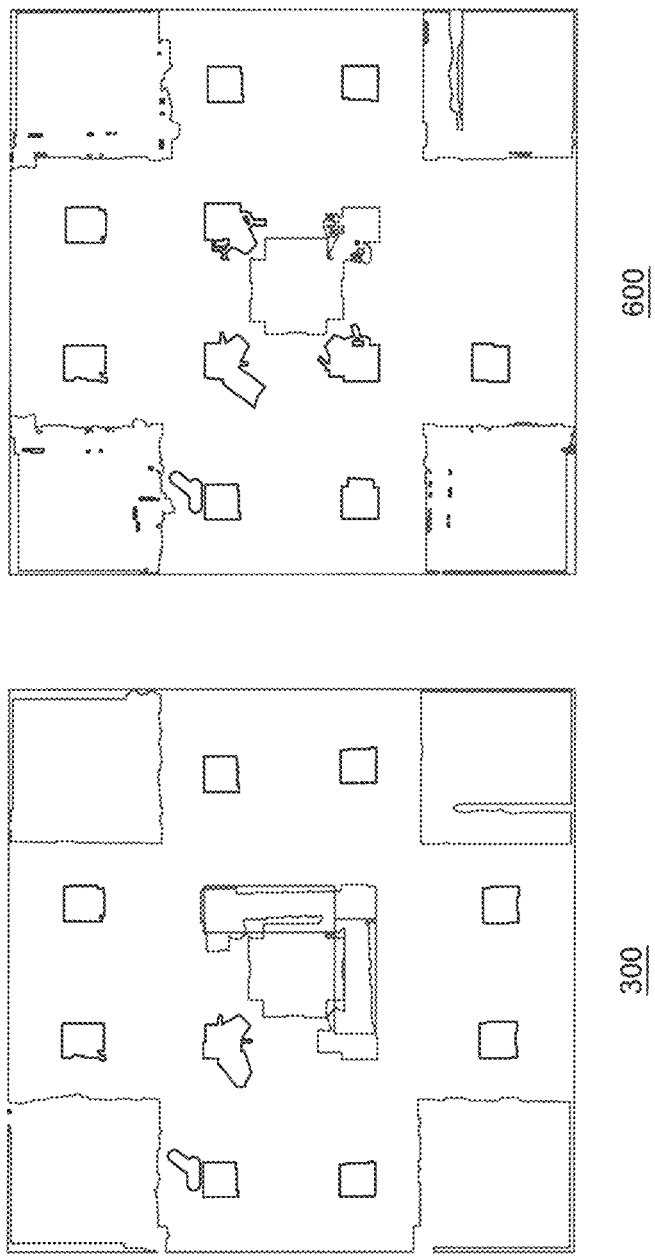
FIG. 6 illustrates the difference of a two-dimensional image taken from a top-down view of the entire target map differs from a two-dimensional image taken from a top-down view of the target map taken as of a particular height.

According to one embodiment, to address this issue, the two-dimensional top-down image of a target map that is used for collision detection for a target object is taken at a particular height in the target map. For example, when taken at the height of a typical player character, the two-dimensional top-down image of the target map appears as image 600 illustrated in FIG. 6. When contrasted with image 300, which is taken at a height that is above all structures of the target map, it is clear that the space below the arches is no longer occupied, and therefore will not create collisions with prop placements.

The height at which the two-dimensional top-down image of a map is taken may vary from implementation to implementation. According to one embodiment, the map image used for collision detection is taken at the typical height of player characters. In alternative embodiment, the image used for collision detection is taken at a height that is based on the height of the prop in question. The techniques described herein are not limited to any particular height-selection criteria for creating the images used for collision detection.

Spatial Rules Based On Heat Maps

As mentioned above, the no-collision rule is one example of a spatial rule by which placements of a prop may be filtered. Another spatial rule may involve the use of "heat maps". For example, during testing of a virtual world, play testers may be asked to play the game in maps where no props have been placed. As the play testers play the game, a monitoring system may keep track of player movements within each map. The movement data collected based on the play testers' movements through each map may be used to construct a "heat map" for the map, where locations through which players moved more often are "hotter" and locations through which players moved less often are "colder".

To avoid placing props in locations that will complicate a user's ability to navigate through a map, locations that are particularly "hot" on a target map may be treated in a manner similar to locations that contain obstructions. Thus, another spatial rule applied by the prop placement tool may be "treat locations where (heat-level>threshold-level) as "occupied". Doing so will cause the prop placement tool to place props such that the props do not obstruct the most-preferred paths through the maps.

Prop-Specific Rules

According to one embodiment, in addition to filtering out placements of a target prop based on spatial rules, placements maybe filtered out based on prop-specific rules. Examples of prop-specific rules include, but are not limited to:
- the prop must be placed with a particular edge of the prop against the edge of a map structure
- the prop must be placed next to a corner created by walls within the map structure
- the prop cannot be placed within a particular distance of any edge
- a particular corner of the prop must align with a particular corner on the map.

Figure 7:
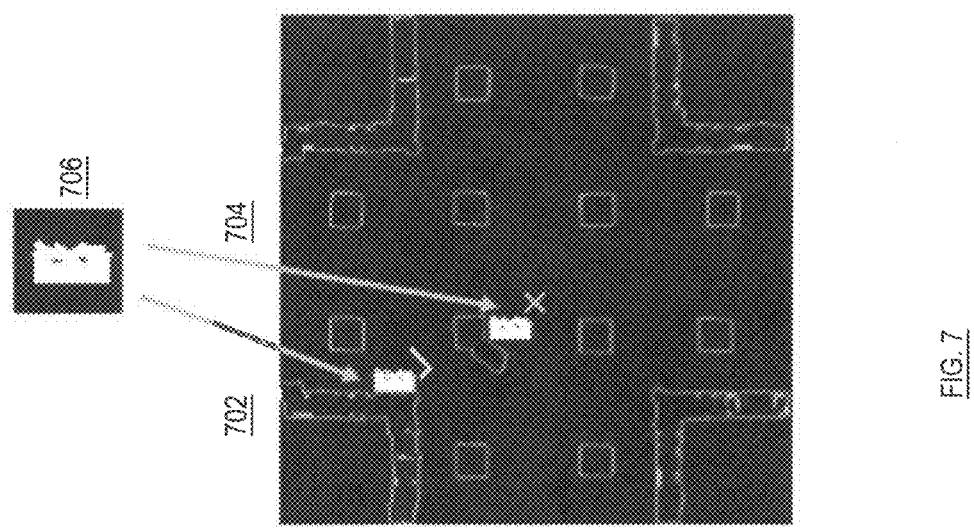
FIG. 7 illustrates a target prop placement that satisfies a prop-specific edge rule and a target prop placement that violates the prop-specific edge rule.

As an example of how placements may be filtered based on prop-specific rules, assume that the cabinet 400 illustrated in FIG. 4 has a prop-specific rule that the cabinet must be placed such that the back edge of the cabinet is up against an edge of the map. FIG. 7 illustrates two possible locations 702 and 704 for placement of a particular orientation-specific prop image 706 of the cabinet. Both locations 702 and 704 satisfy the no-collision spatial rule. However, only location 702 satisfies the prop-specific rule. Consequently, the placement (i.e. the combination of location 704 and orientation-specific prop image 706) will be filtered out from the candidate set of placements for cabinet 400.

Figure 19:
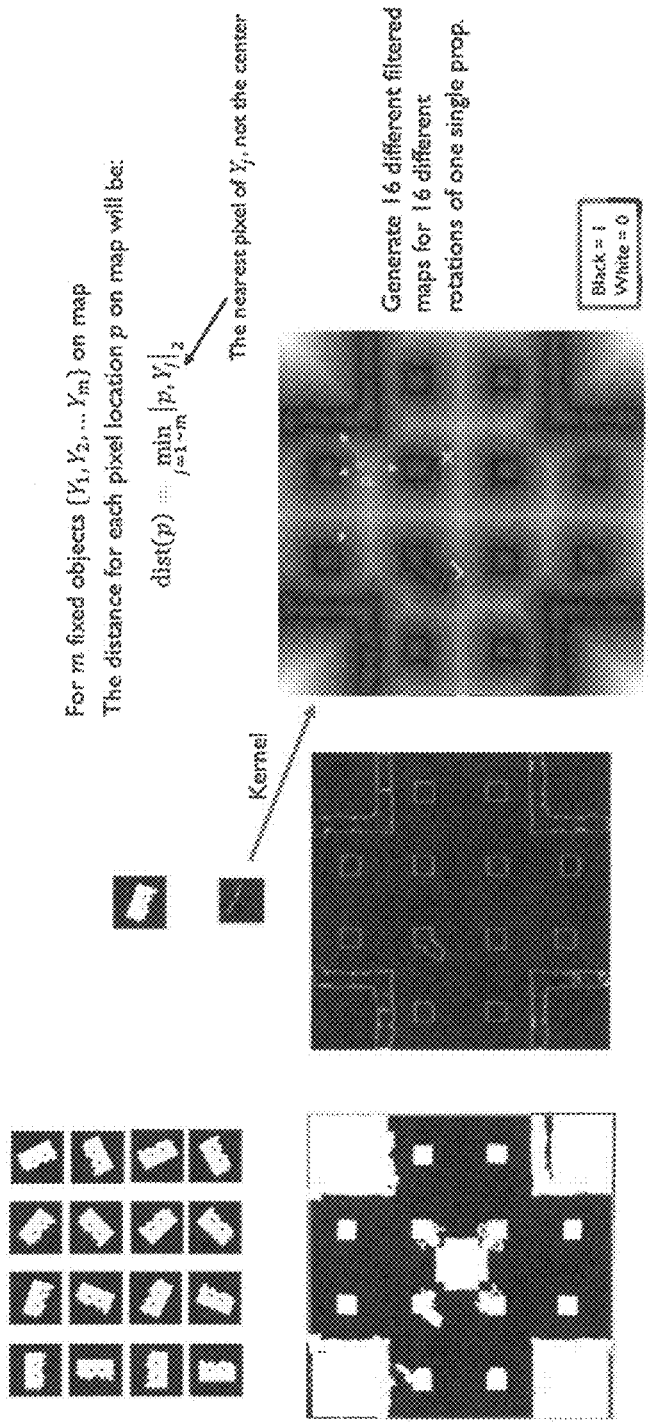
FIG. 19 illustrates how a prop-specific rule, that a prop must be adjacent to an edge, may be implemented.

FIG. 19 illustrates how a prop-specific rule of "must be adjacent to an edge" may be implemented, according to an embodiment. Specifically, in the technique illustrated in FIG. 19, 16 different filtered maps are generated, with one filtered map for each of the 16 different orientations of the target prop.

Selecting Among Valid Prop Placement Outcomes

Even after filtering out invalid placements for each target prop for a target map, the number of valid prop placement outcomes may be so great that it would be infeasible for a human to consider them all in an effort to select the best prop placement outcome. Therefore, the prop placement tool is configured to automatically select a "best" prop placement outcome based on a trained machine learning mechanism.

According to one embodiment, the prop placement tool selects the best prop placement outcome based on a trained machine learning mechanism that is trained based on at least one training map upon which props have been placed. The placement of the props in the training maps is treated as the "ideal placement". The placement of the props on the training map(s) may be performed in any manner that is considered to result in an ideal placement. For example, in some embodiments, the props may be manually placed on a training map by expert graphic artists. The techniques described herein are not limited to any particular manner of placing props on the training maps.

The one or more training maps that are used to train the machine learning mechanism need not include the target map. Further, the props placed on the training map(s) need not be the same props that are to be placed on the target map. According to one embodiment, the final prop placement outcome is selected based on (a) how closely the prop placement outcome reflects the prop-to-fixed-object distances of objects in the training map(s), and (b) how closely the prop placement outcome reflects the prop-to-prop distances in the training map(s).

Figure 11:
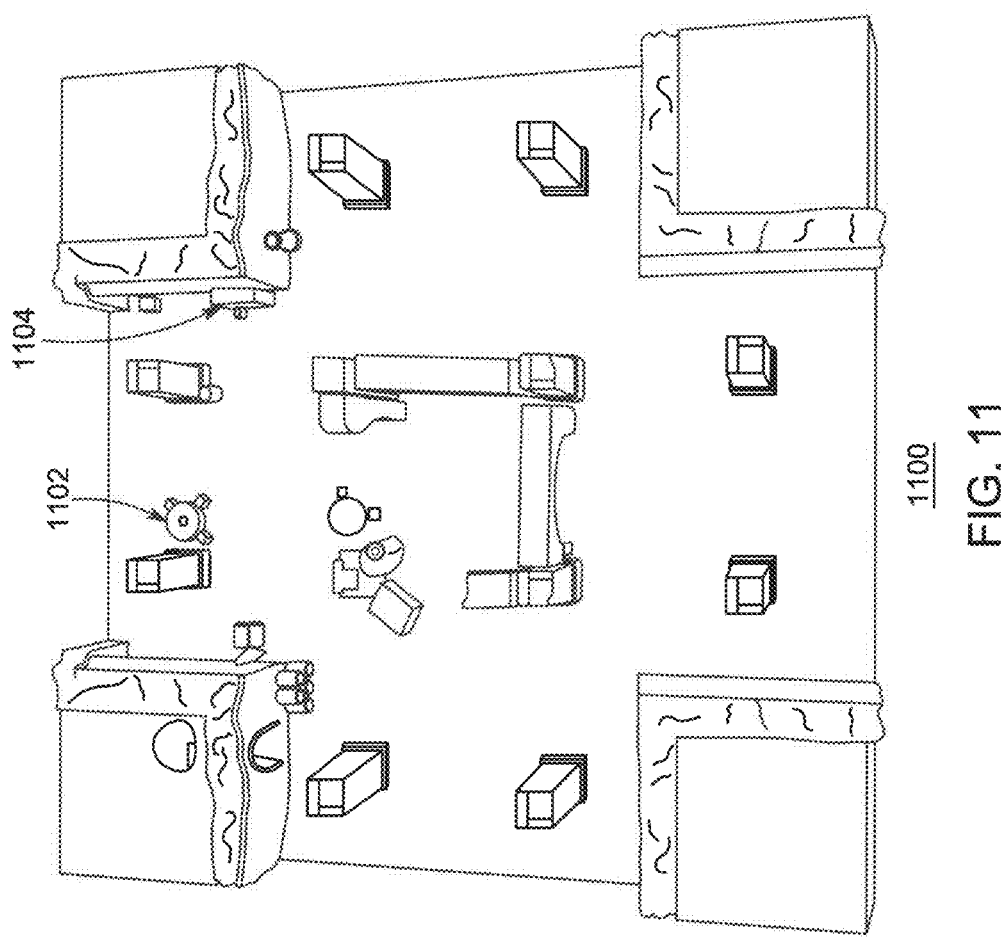
FIG. 11 illustrates a training map in which props have been place in an ideal placement.

Referring to FIG. 11, it illustrates a training map 1100 that may be used to train a machine learning mechanism to select the final prop placement outcome for target map 100a. In the present example, the training map 1100 is the same as the target map 100a. However, as mentioned above, the training map(s) need not be the same as the target map. Training map 1100 includes props (e.g. props 1102 and 1104) that have been placed in an "ideal placement". How training map 1100 is used to train a machine learning mechanism to select the final prop placement for target maps shall be described in detail hereafter.

Learning Prop-To-Fixed-Object Distance Probabilities

According to one embodiment, the training of the machine model involves learning the probability of prop-to-fixed-object distances of props (e.g. props 1102 and 1104) placed in the ideal placement reflected by each training map (e.g. map 1100). Learning the prop-to-fixed-object distances involves learning the relationship between each prop (X), and every fixed object (Y) that is already on the training map 1100. In training map 1100, the fixed objects ($Y_1, Y_2 \ldots Y_m$) may include each pillar, each block, each statue, etc. that is on map 1100.

From the placement of the props in the training map(s), the machine learning engine may compute probability functions for the distances between every (prop, fixed-object) combination. For example, prop 1102 is placed at a particular placement in the training map 1100. For the purpose of explanation, assume that there are six fixed objects ($Y_1, Y_2 \ldots Y_6$) on the training map 1100. Under these circumstances, the gamma distribution is fit six times for prop 1102, once for each of the six fixed objects.

Figure 10:
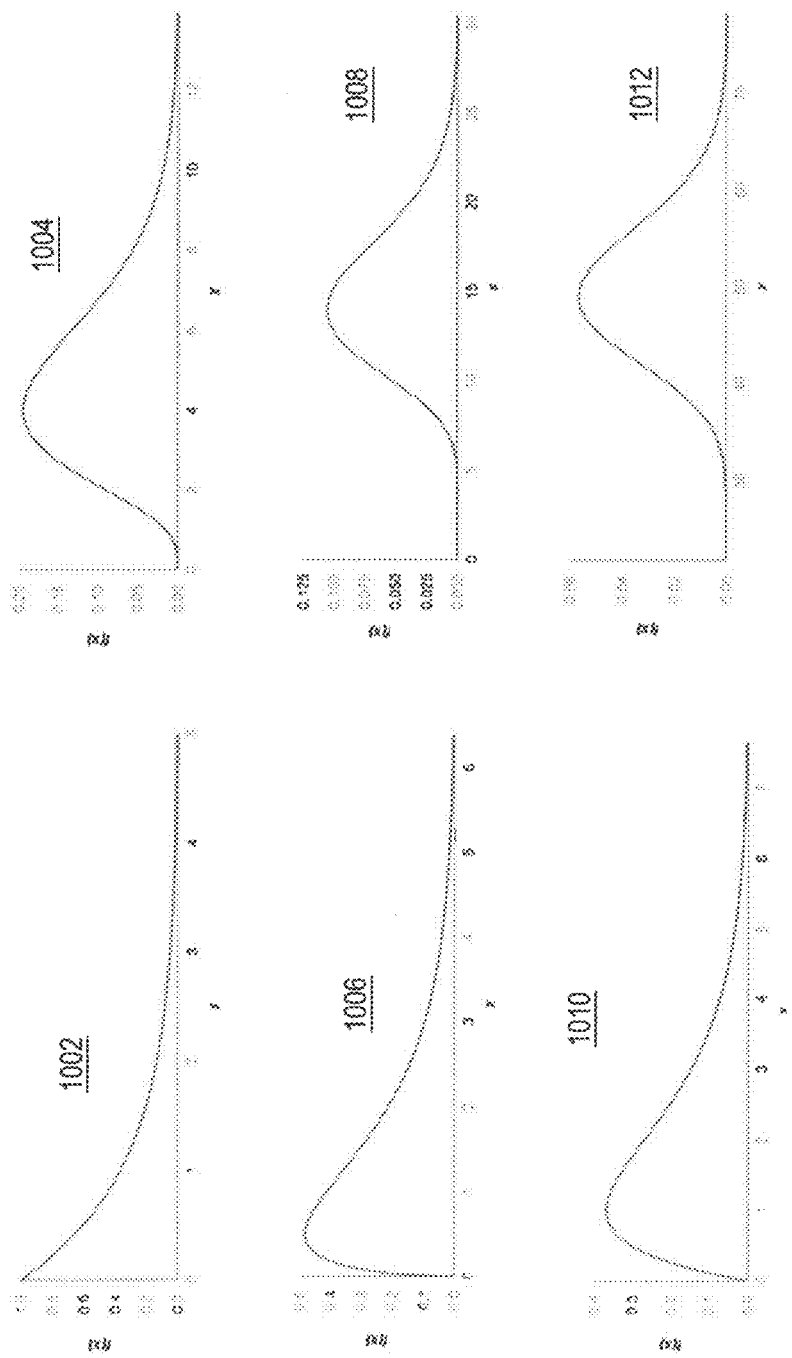
FIG. 10 shows probability functions for prop-to-fixed-object distances that may be learned by a machine learning mechanism based on a training map in which props have been placed in an ideal placement.

Referring to FIG. 10, it illustrates the six probability functions that may result from fitting the gamma distribution based on the distance of prop 1102 (as placed in map 1100) to each of the six fixed objects in map 1100. For the purpose of explanation, assume that the first fixed object is a wall against which prop 1102 is placed in the training map. Under these circumstances, fitting the gamma distribution may result in the function illustrated as 1002, which indicates that prop 1102 is much more likely to be against that wall (distance=0) than to be further away from the wall.

In contrast, function 1004 may be the result of fitting the gamma distribution based on the location of prop 1102 in the training map and a pillar in the training map. As illustrated by function 1004, the prop 1102 is most likely to be at a distance of "4" from the pillar. Distances between prop 1102 and the pillar that are closer 4 or further than 4 are less likely. The four remaining graphs 1006, 1008, 1010 and 1012 illustrate the results of fitting the gamma function for (a) the position of prop 1102 in the training map 1100 and (b) each of the other four fixed objects in the training map 1100. While the present example assumes that the training map has only sixed fixed objects, in complex maps the number of fixed objects may be significantly higher.

Figure 8:
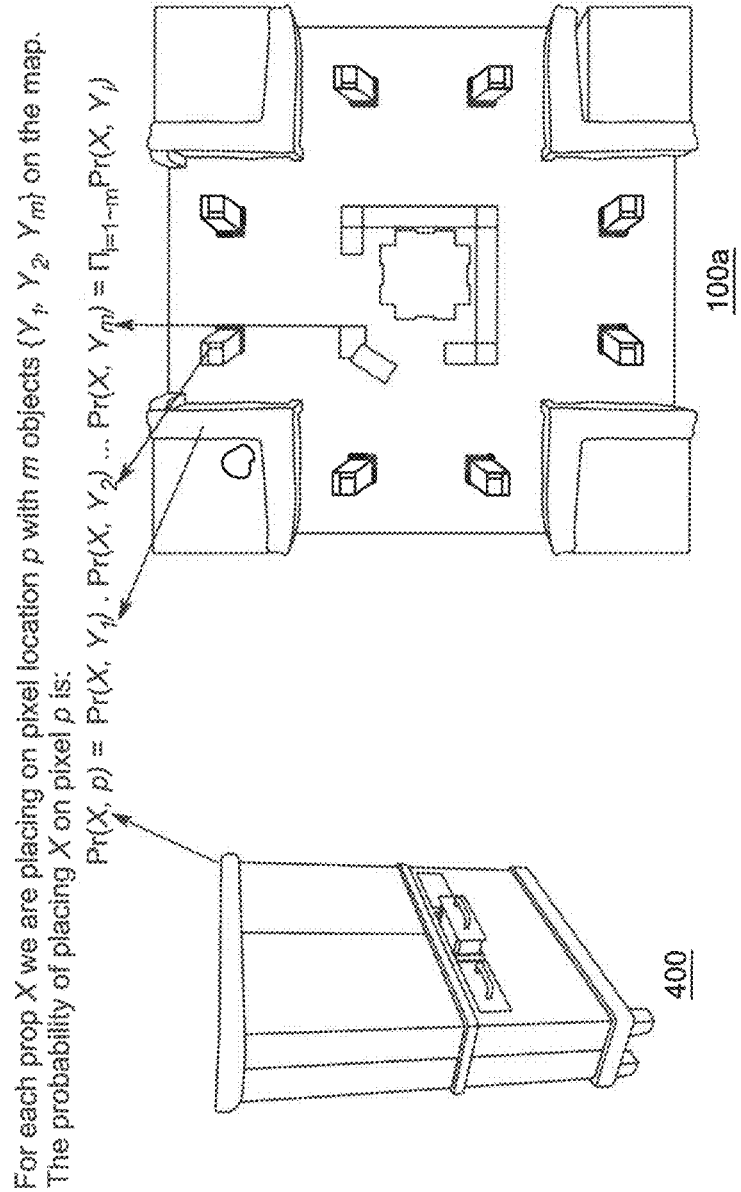
FIG. 8 illustrates a formula for determining a prop-to-fixed-object distribution score for a particular placement of a target prop.

Using the Learned Prop-To-Fixed-Object Distances to Determine Prop-To-fixed-Object Distance Scores Once the distribution probability functions (illustrated in FIG. 10) have been learned from the training map(s) for a particular prop, those functions may be used to determine prop-to-fixed-object distance scores (P2FO scores) for a corresponding target prop. Referring to FIG. 8, it illustrates a formula for determining a P2FO score Pr(X, p) for a given (prop, placement) combination. The P2FO score for a given (prop, placement) combination indicates the probability that the given prop X should be placed at the particular location (p) in the target map, based on the distances that the placement will produce between the prop X and the m fixed objects ($Y_1, Y_2 \ldots Y_m$) on the target map.

In the example illustrated in FIG. 8, the target prop that corresponds to X is cabinet 400. The fixed objects ($Y_1, Y_2 \ldots Y_m$) are fixed objects on the target map 100a. For the purpose of explanation, it shall be assumed that $Y_1, Y_2 \ldots Y_m$ are six fixed objects on the target map 100a that correspond to the six fixed objects from training map 1100. As mentioned above, the target map need not be the same map as the training map(s). Consequently, the fixed objects on the target map need be the same six objects that were on the training map(s). When the objects of the training map differ from the objects of the target map, a correlation is established between the objects of the training map and the objects of the target map. For example, a particular pillar in the training map may be mapped to a particular statue in the target map.

While six fixed objects are identified in this example, the m fixed-objects used to calculate the P2FO score will typically be significantly higher, and may include every wall, every pillar, and every other significant fixed object on the target map 100a.

According to one embodiment, a P2FO score Pr(X,p) of a target prop is calculated for every placement that was determined to be valid for the target prop after applying the spatial and prop-specific rules described above. For example, FIG. 9 illustrates a specific placement of cabinet 400 on map 100a, and the distances produced by that placement of cabinet 400 to fixed objects on map 100a.

To calculate the probability of the distance between each (target prop, fixed object) combination, the distance produced by the placement for the (target prop, fixed object) combination is fed into a corresponding probability function that was created for that particular (prop, fixed object) combination during the training phase. The product of the probabilities for the distances of each of those (prop, fixed object) combinations is then used as a P2FO score for the P2FO distances produced by that particular placement.

Figure 9:
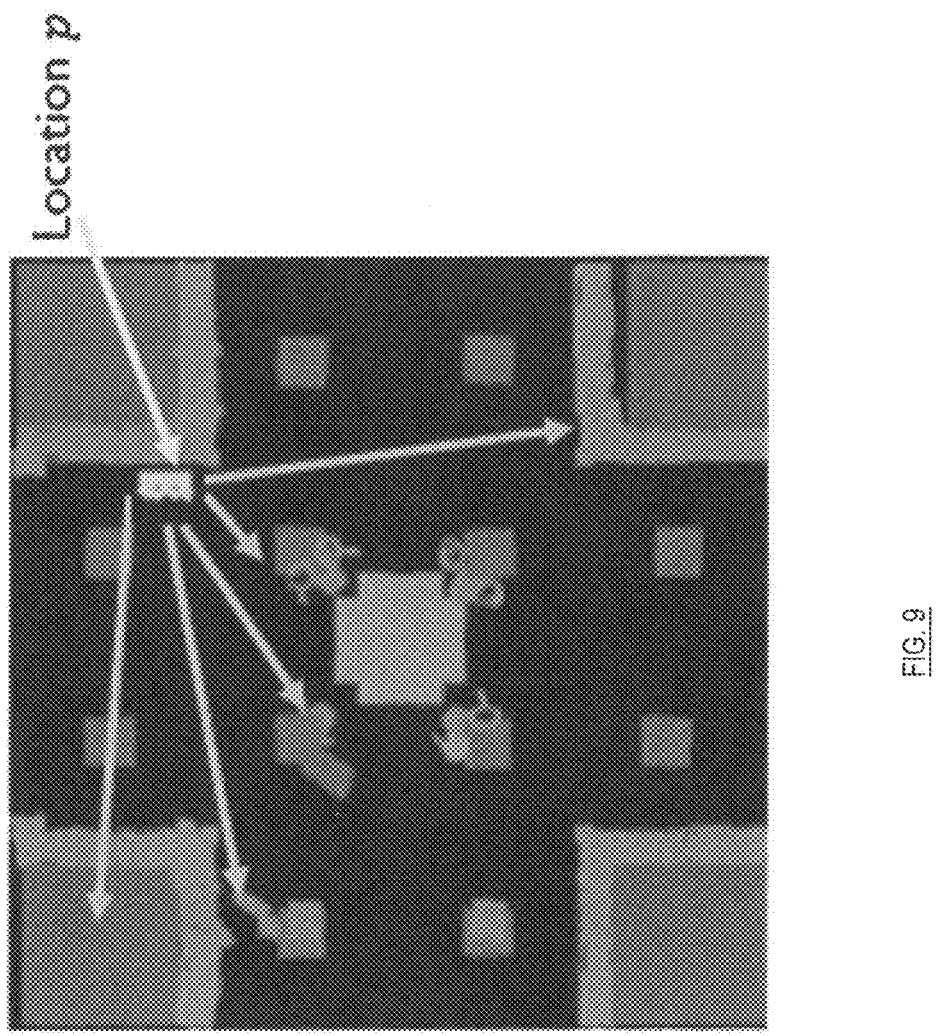
FIG. 9 illustrates the prop-to-fixed-object distances for a particular placement of a target prop.

For example, when the cabinet is placed at placement p illustrated in FIG. 9, the P2FO score for (cabinet, placement p) may be the product of:

Pr(cabinet, object 1)=(probability, determined by function 1002, of the distance between the cabinet and object 1 when the cabinet is placed at placement p)

Pr(cabinet, object 2)=(probability, determined by function 1004, of the distance between the cabinet and object 2 when the cabinet is placed at placement p)

Pr(cabinet, object 3)=(probability, determined by function 1006, of the distance between the cabinet and object 3 when the cabinet is placed at placement p)

Pr(cabinet, object 4)=(probability, determined by function 1008, of the distance between the cabinet and object 4 when the cabinet is placed at placement p)

Pr(cabinet, object 5)=(probability, determined by function 1010, of the distance between the cabinet and object 5 when the cabinet is placed at placement p)

Pr(cabinet, object 6)=(probability, determined by function 1012) of the distance between the cabinet and object 6 when the cabinet is placed at placement p)

In the formula illustrated in FIG. 8, the P2FO score for a placement is produced by multiplying all individual P2FO distance probabilities produced by the placement. However, in situations were the target map deviates significantly from the training map(s), some of those individual probabilities may be very small. Therefore, the formula may be changed to account for differences between the target map and the training map. For example, rather than multiply the individual P2FO distance probabilities produced by the placement, those individual probabilities may be summed. The specific formula for determining the P2FO distances may therefore vary from situation to situation.

Learning Prop-To-Prop Distance Probabilities

Figure 12A:
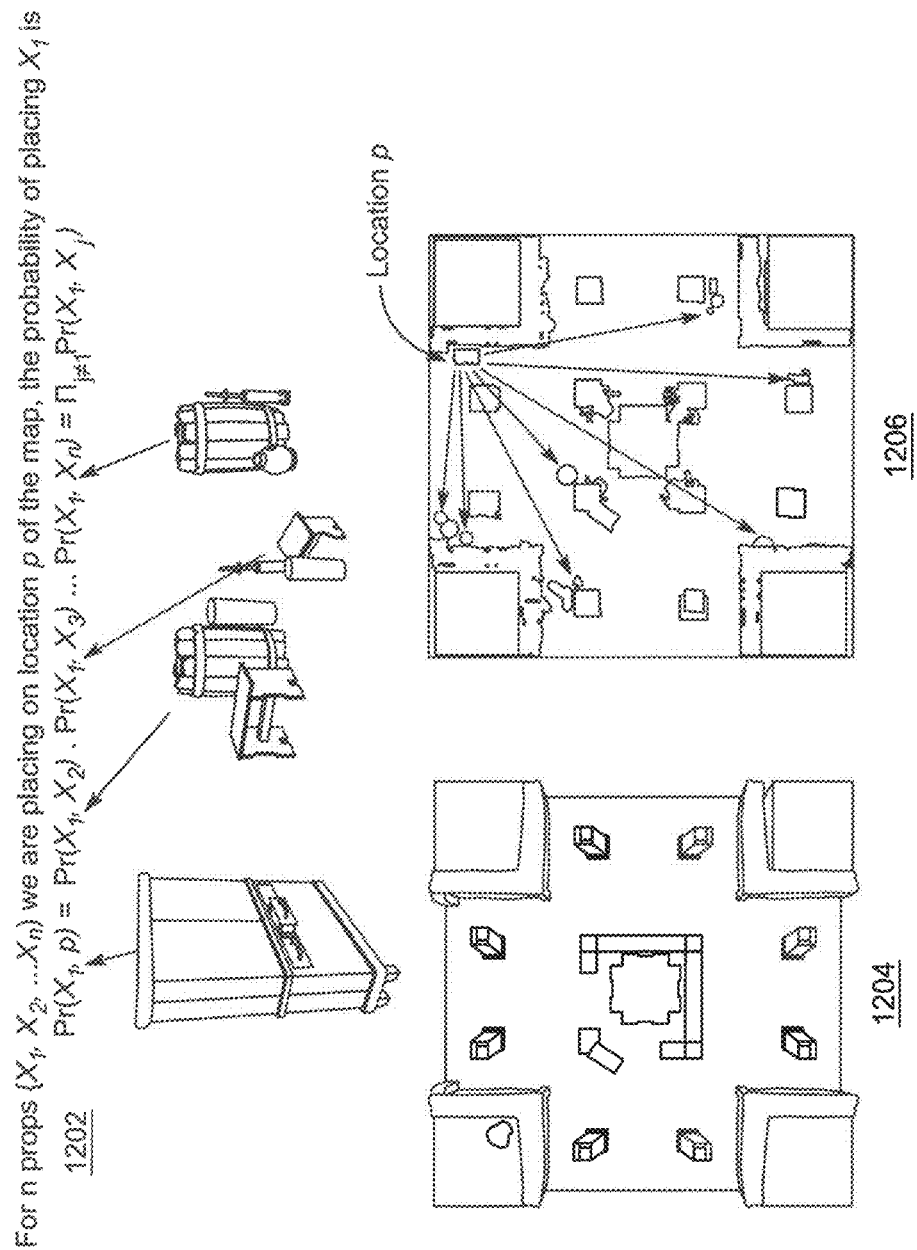
FIG. 12 (consisting of FIGS. 12A and 12B) illustrates a formula for determining a prop-to-prop distribution score for a particular placement of a target prop.
Figure 12B:
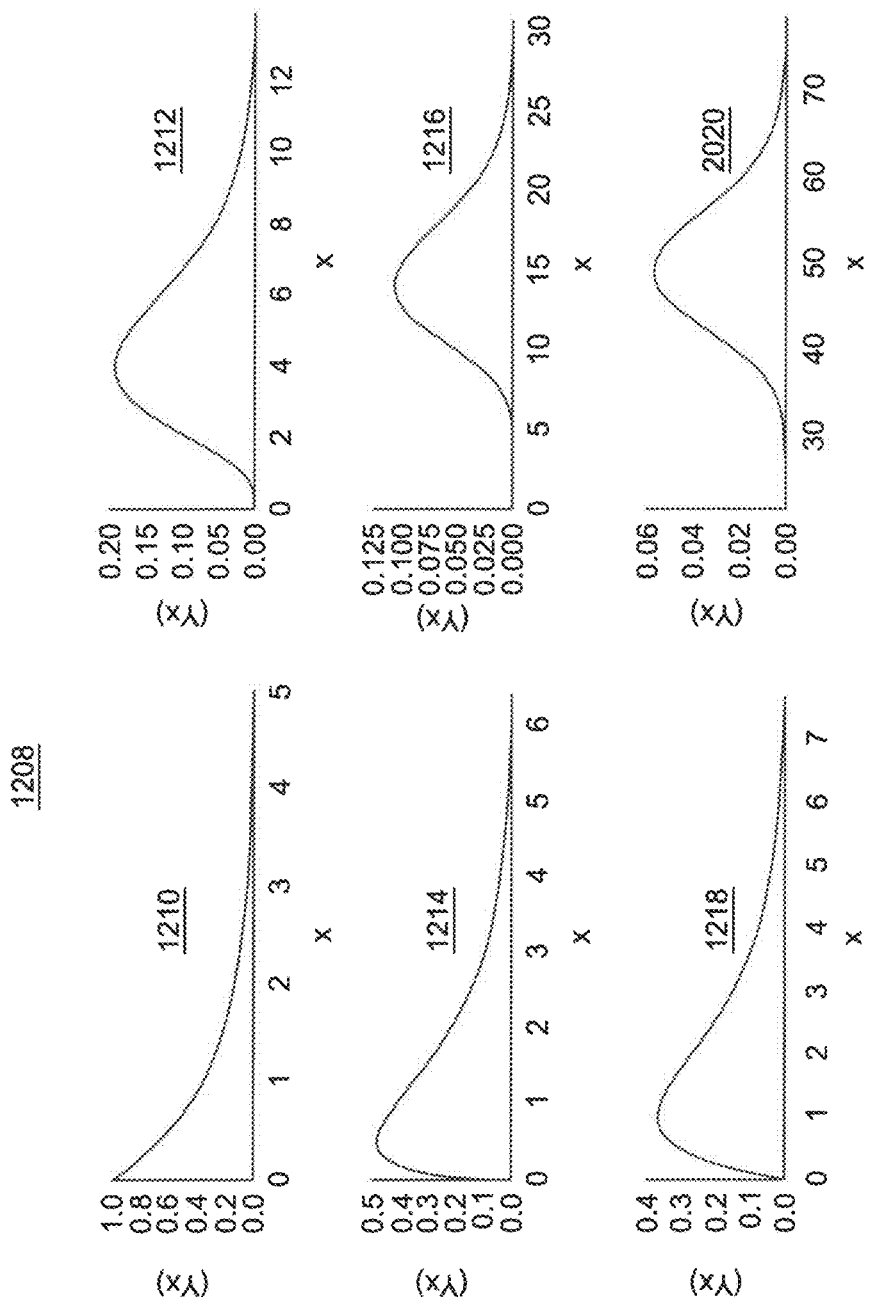

The machine learning mechanism may be trained to learn prop-to-prop distance probabilities in a manner that is similar to the learning of P2FO probabilities, described above. Referring to FIG. 12, given a training map 1204 on which props have been place in an ideal placement, the machine learning mechanism may fit a gamma distribution based on distances between each prop placed in the training map and each other prop placed in the training map.

Map 1206 illustrates the cabinet-to-other-prop distances that result from the fact that the cabinet is placed at location p on the training map. Functions 1208 represent the probability functions that result from the distances illustrated in map 1206, where each function corresponds to a given (cabinet, other prop) combination. For example, one function may indicate the probability of distance between the cabinet and a barrel, while another function may indicate the probability of distance between the cabinet and a bench.

Using the Learned Prop-To-Prop Distances to Determine Prop-To-Prop Distance Scores Once the distance probability functions have been determined for each (prop, prop) combination, those probability functions may be used to generate a prop-to-prop distance score (a P2P score) for each valid placement of a target prop on the target map. According to one embodiment, formula 1202 is used to calculate a P2P score for a given placement of a target prop. In the illustrated embodiment, the P2P score is the product of the probabilities of the distances (which result from a given placement of the cabinet on the target map) between the cabinet and every other prop on the target map. Thus, where the cabinet is represented by $X_1$, the P2P score for a particular placement of the cabinet on the target map is the product of:

Pr(cabinet, prop 1)=(probability, determined by function 1210, of the distance between the cabinet and prop 1 when the cabinet is placed at placement p)

Pr(cabinet, prop 2)=(probability, determined by function 1212, of the distance between the cabinet and prop 2 when the cabinet is placed at placement p)

Pr(cabinet, prop 3)=(probability, determined by function 1214, of the distance between the cabinet and prop 3 when the cabinet is placed at placement p)

Pr(cabinet, prop 4)=(probability, determined by function 1216, of the distance between the cabinet and prop 4 when the cabinet is placed at placement p)

Pr(cabinet, prop 5)=(probability, determined by function 1218, of the distance between the cabinet and prop 5 when the cabinet is placed at placement p)

Pr(cabinet, prop 6)=(probability, determined by function 1220) of the distance between the cabinet and prop 6 when the cabinet is placed at placement p)

In the formula 1202 illustrated in FIG. 12, the P2P score for a placement of a prop is produced my multiplying all individual prop-to-prop distance probabilities produced by the placement. However, in situations where the target map deviates significantly from the training map(s), some of those individual probabilities may be very small. Therefore, as discussed above with respect to the P2FO score formula, the P2P score formula may be changed to account for differences between the target map and the training map.

Using P2FO Scores and P2P Scores to Generate Distribution Scores

According to one embodiment, the P2FO score for a particular (target prop, placement) combination and the P2P score for the same particular (target prop, placement) combination may be combined to generate a distribution score for the (target prop, placement) combination. The higher the distribution score, the better the distribution produced by the placement is considered to be.

Figure 13:
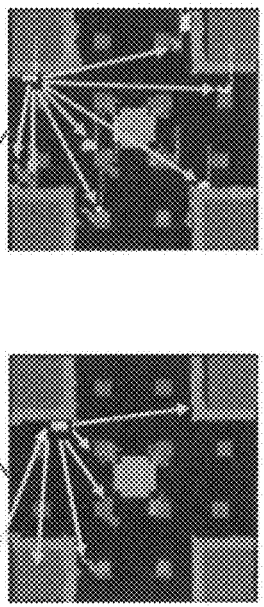
FIG. 13 illustrates a formula for determining a distribution score based on a prop-to-fixed-object distribution score and a prop-to-prop distribution score.

FIG. 13 illustrates a formula 1302 that produces a distribution score for a given (target prop, placement) combination by multiplying the P2FO score 1304 for the (target prop, placement) combination by the P2P score 1306 for the (target prop, placement) combination. When the training map and the target map are identical or nearly identical, formula 1302 may be the desirable way to determine the placement score.

Figure 20:
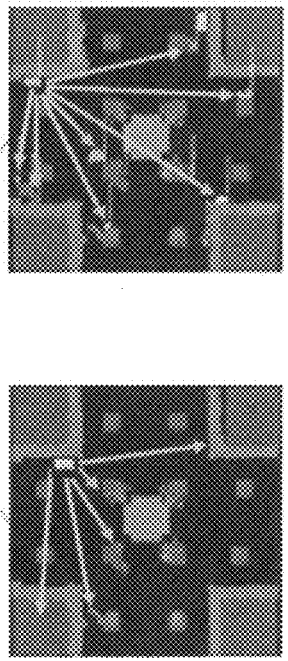
FIG. 20 illustrates how addition may be used in place of multiplication to produce a "looser probability" score that may be more suitable for situations where the training map(s) differ from the target map.

However, in situations where the training map and the target map differ significantly, a looser version of the distribution may be desirable to avoid having the prop placement tool conclude that, for a given target prop, no placement for the prop produces a distribution that is good enough. As mentioned earlier, loosening of the distribution may be achieved, for example, by using addition to combine the probabilities, rather than multiplication. Referring to FIG. 20, it illustrates how addition may be used in place of multiplication to produce a "looser probability" score.

Proximity Scores

According to one embodiment, in addition to a distribution score, the prop placement tool generates a proximity score for each (prop, placement) combination. The proximity score relates to how close the placement puts the prop to any other object (including map structures and already-placed props) on the target map. Depending on the nature of a prop, it may be desirable to place the prop near some other structure. For example, it is more natural for a barrel to be placed against something (a wall, pillar, or other prop), rather than for it to be placed in the middle of an empty space on the map. On the other hand, some props, such as a circular fountain, may be better-placed in the middle of an empty space.

Figure 14:
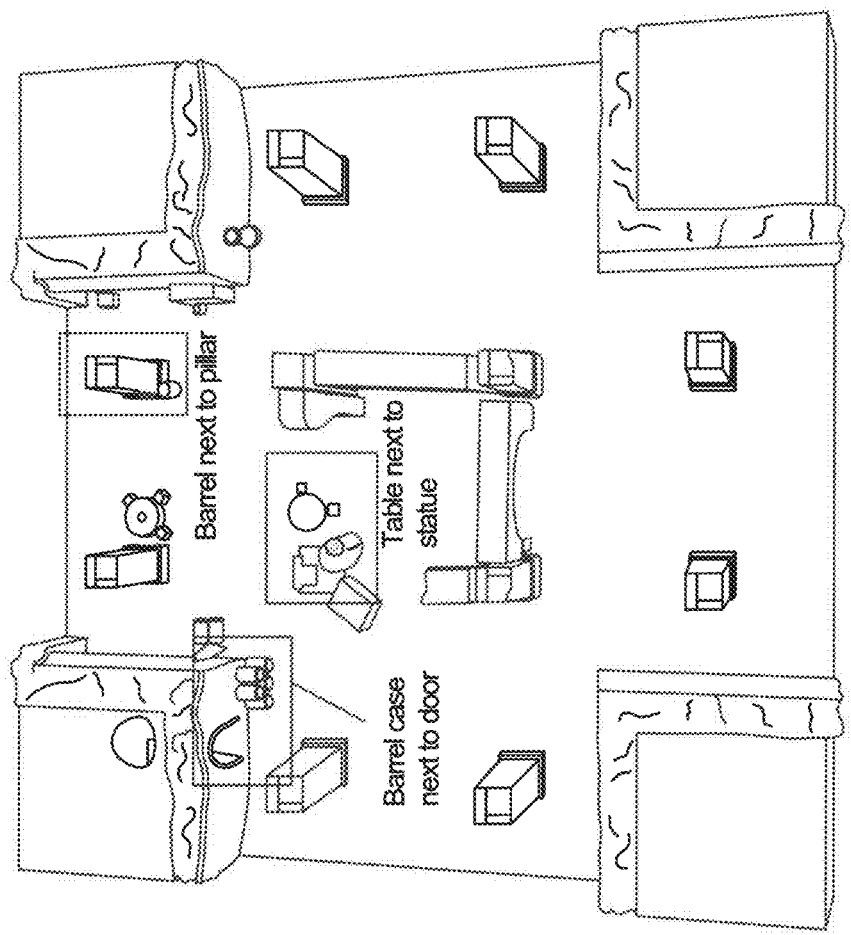
FIG. 14 illustrates how proximity rules may apply to the placement of props.

The preferred proximity distance of a prop may be specified as an attribute of the prop, or may be learned from the placement of the prop on the training map(s). For example, the training map illustrated in FIG. 14 depicts a barrel next to a pillar, a barrel case next to a door, and a table next to a statue. Based on this training map, it may be determined that these three props should be adjacent to (proximity distance=0) at least one other structure.

According to one embodiment, proximity scores may be determined by first generating a distance transform based on the target map. The distance transform takes into account both map structures and already-placed props. FIG. 15 illustrates a distance transform 1502 of target map 100a, according to an embodiment. In distance transform 1502, completely black areas (assigned value 1) are occupied by a pre-existing map element (e.g. a map structure or an already-placed target prop). All other locations are given a number between 0 (represented as white) and 0.99 (represented as dark gray). In the present example, with the exception of the occupied spaces, the higher the number, the higher the proximity score.

Figure 21:
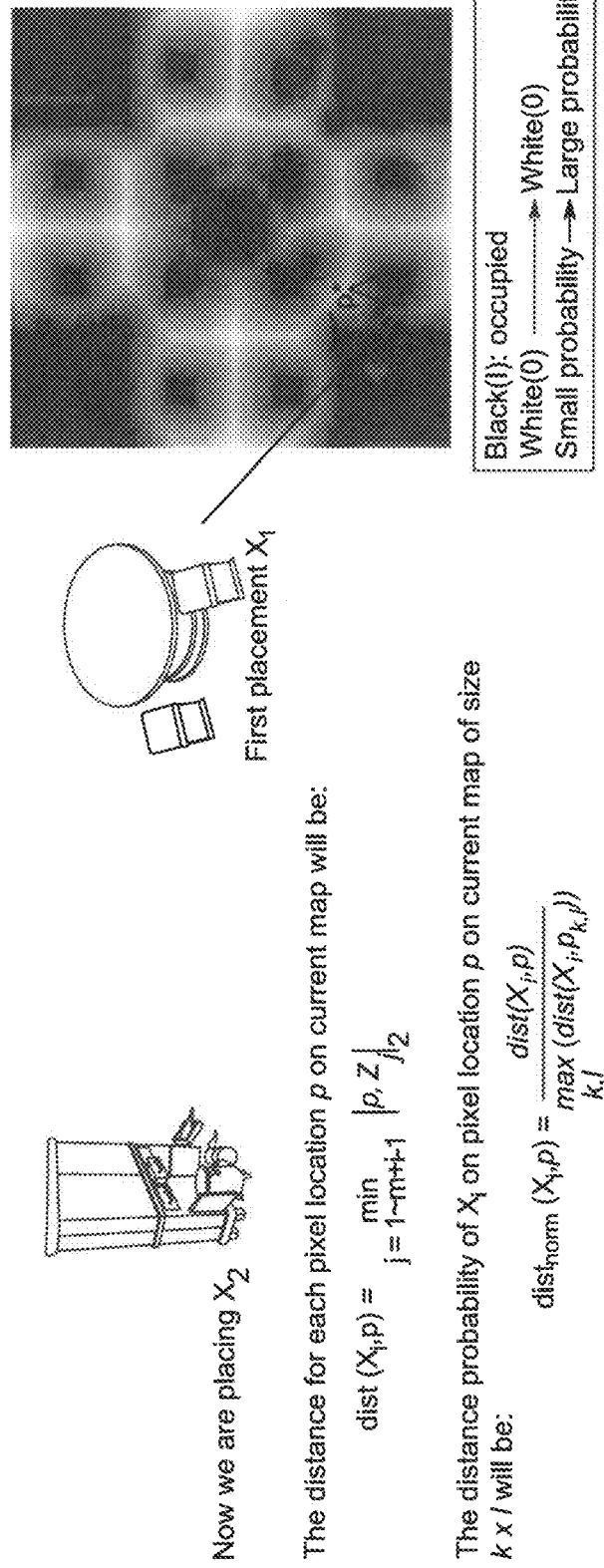
FIG. 21 illustrates a formula for determining distance probability of placing a particular prop on a particular pixel location of a target map, according to an embodiment.

In the example distance transform 1502, the locations associated with higher numbers (darker greys) are adjacent to occupied locations. The further a location is from any occupied location, the lower the proximity score. This represents a distance transform for a target prop (e.g. a barrel) that should be placed adjacent to an existing structure. While the barrel cannot be place in the same location as an existing structure, the closer to the structure, the better the location is considered to be (and thus the higher the proximity score). Referring to FIG. 21, it illustrates a formula for determining a distance probability for placing a particular prop on a particular pixel of the target map, according to an embodiment.

According to one embodiment, the distance transform for a prop may vary based on the size of the prop. For example, the distance transform for a very small prop may only have high proximity scores immediately adjacent to occupied locations. On the other hand, the distance transform for a larger object may have relatively high proximity scores both for locations immediately adjacent to occupied locations and for locations that are slightly further from occupied locations. FIG. 22 illustrates how distance may be made proportional to the volume of a prop, according to an embodiment.

Sequential Proximity Score Determinations

Unfortunately, generating distance transforms for all props based on a target map that is free of any other props may result in problems. Specifically, if the distance transform for both prop 1 and prop 2 indicate that a particular map location is unoccupied and has a high proximity score, it may appear that that location is ideal for both prop 1 and prop 2. However, if prop 1 is placed on that location, then that location ceases to be ideal for prop 2 (since prop 2 cannot be placed on an already-occupied location). Therefore, according to one embodiment, the target props are processed sequentially, and the distance transform used by each prop takes into account the existence of all already-placed props.

Figure 16:
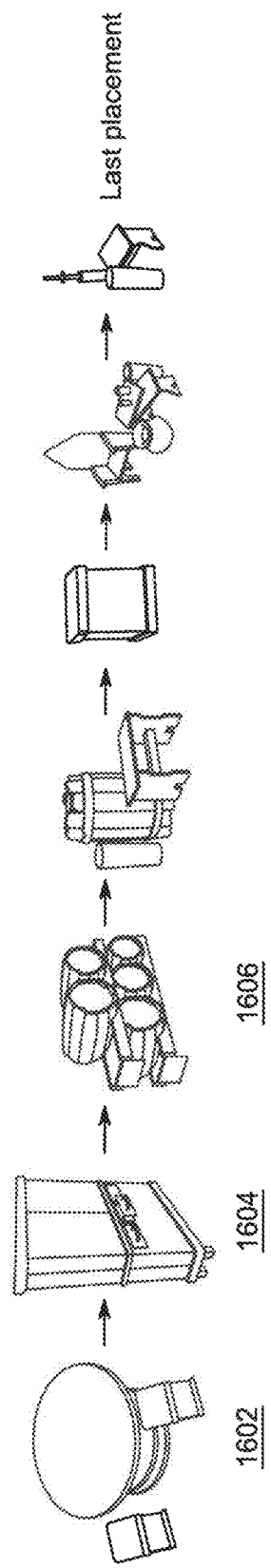
FIG. 16 illustrates how a placement sequence may be established for a set of target props based on relative sizes of the target props.

According to one embodiment, the props are placed in a sequence that is based on size, with the larger props being placed before smaller props. FIG. 16 illustrates an example of the sequence of target prop placement, from largest to smallest, of a set of seven target props. The distance transform used for the proximity score to place the largest prop 1602 (e.g. distance transform 1502) does not take into account any other target prop. Consequently, in the distance transform 1502 for prop 1602, the only occupied locations are locations occupied by the map structures of the target map. On the other hand, the distance transform for a smaller, later-placed prop (e.g. prop 1606) may have additional "occupied" locations that correspond to the already-placed props, as illustrated in distance transform 1504.

Placement Scores

Figure 17:
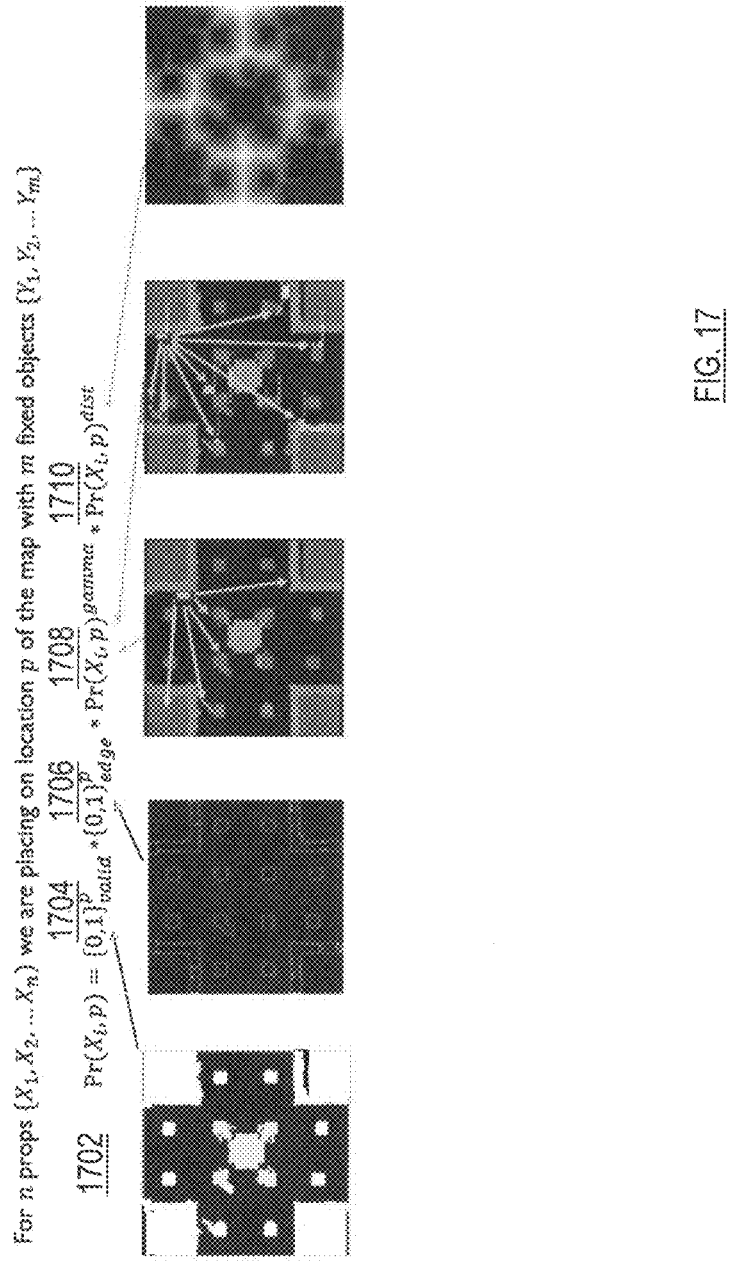
FIG. 17 illustrates a formula for generating a placement score for possible placement of a target prop on the target map.

After generating the distance transform for target prop 1602, the placement tool determines a "final placement" for the largest prop 1602 based on the distribution and proximity scores computed for each valid placement for prop 1602 on the target map. Referring to FIG. 17, it illustrates a formula 1702 that may be used to determine an overall "placement score" for a given (target prop, placement) combination. After generating the placement score for each candidate placement of a target prop, the prop placement tool selects the placement with the highest score as the placement for the target prop.

As illustrated in FIG. 17, the formula 1702 for the placement score for any given (prop, placement) combination includes:
- a spatial rule compliance component 1704 that reflects the degree to which the placement complies with spatial rules, such as the "no-collision" rule
- a prop-specific rule component 1706 that reflects the degree to which the placement complies with any prop-specific rules, such as whether the prop has an edge that must be placed against an edge of the map
- a prop distribution component 1708 that reflects the degree to which the placement matches the placement of corresponding props on one or more training maps. In the illustrated embodiment, the prop distribution component takes into account both the P2FO score of the placement and the P2P score of the placement.
- a proximity score component 1710 that reflects the degree to which the proximity of the prop to other objects on the map reflects the ideal proximity for the prop in question (e.g. if the prop should be placed adjacent to an edge, the proximity score reflects the degree to which the placement puts the prop against an edge).

Once the placement scores for all placements of prop 1602 are determined, the placement with the highest placement score is selected as the placement for prop 1602. In an alternative embodiment, a probability is assigned to each valid location. The final placement of the prop is then determined by sampling the valid locations according to the probability distribution. For example, assume a prop has just three valid locations, A, B, and C. The algorithm might assign A a probability of 0.6, B a probability of 0.3 and C a probability of 0.1. So 6 times out of 10, the algorithm will choose A as the final placement of the prop, 3/10 times it chooses B as the final placement for the prop, and $\frac{1}{10}$ times it chooses C as the final placement of the prop.

This process is then repeated for prop 1604. However, when generating the distance transform for prop 1604, the prop placement tool assumes that prop 1602 has been placed on the target map in the placement determined to be the final placement for prop 1602. Thus, the distance transform for 1604 will indicate that the map location(s) covered by prop 1602 are "occupied". Based on this new distance transform, the placement score for each of prop 1604's candidate placements may be determined (e.g. using formula 1702). Once the placement scores for all placements of prop 1604 are determined, the placement with the highest placement score is selected as the placement for prop 1604 (or the final placement is determined by sampling the valid locations based on the probability distribution).

This process is then repeated for prop 1606. When generating the distance transform for prop 1606, the prop placement tool assumes that props 1602 and 1604 have been placed on the target map at their respective "final" placements. Thus, the distance transform for 1606 will indicate that the map locations covered by props 1602 and 1604 are "occupied". Based on this new distance transform, the placement score for each of prop 1606's candidate placements may be determined (e.g. using formula 1702). Once the placement scores for all placements of prop 1606 are determined, the placement with the highest placement score is selected as the placement for prop 1606 (or the final placement is determined by sampling the valid locations based on the probability distribution).

This process is repeated until "final" placements have been selected for each of the target props. The prop placement tool then generates output that reflects those placements, which collectively constitutes a "placement outcome" for placing the target props on the target map.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 18:
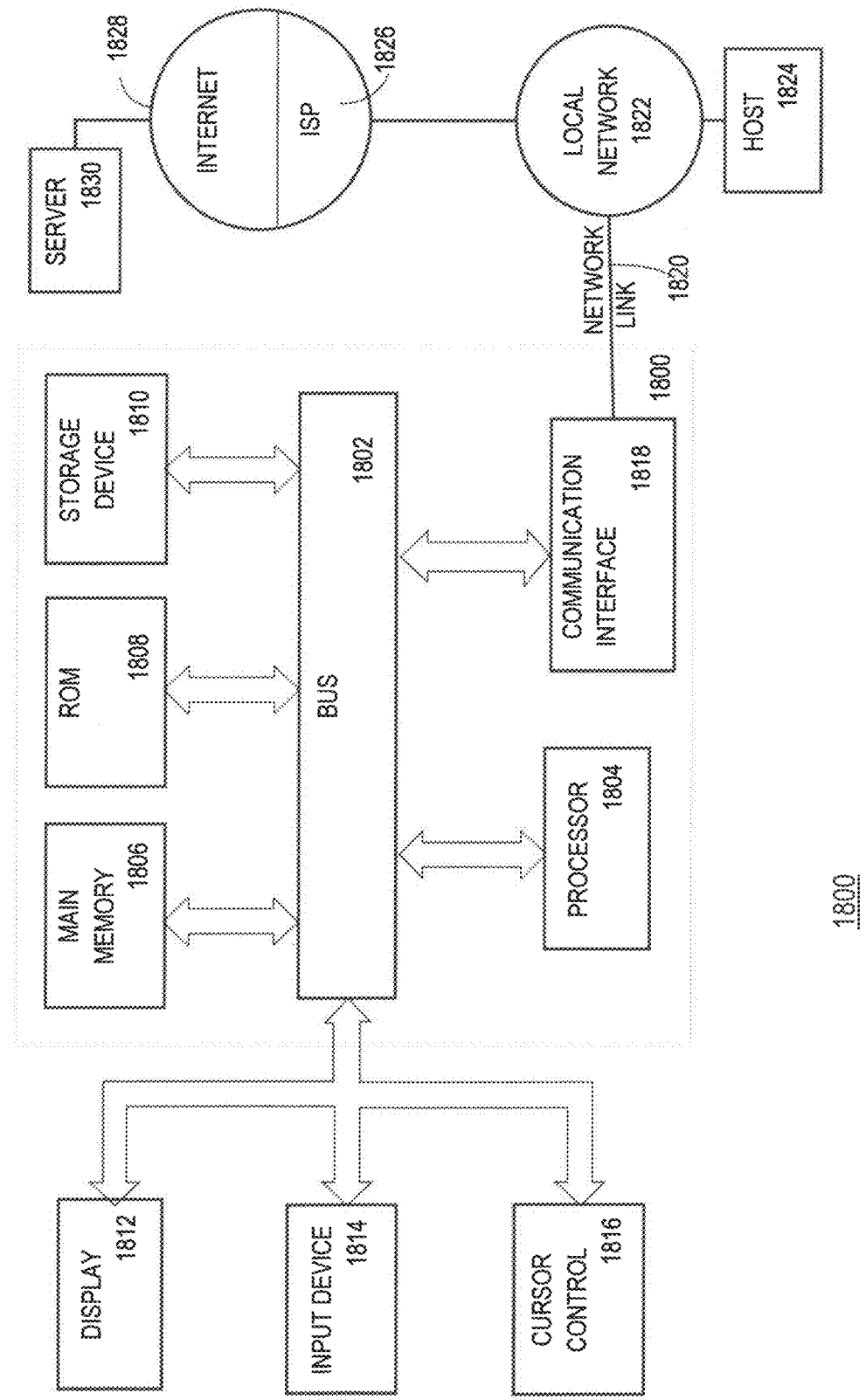
FIG. 18 is a block diagram of a computer system that may be used to execute a prop placement tool that implements the automated prop placement techniques described herein.

For example, FIG. 18 is a block diagram that illustrates a computer system 1800 upon which an embodiment of the invention may be implemented. Computer system 1800 includes a bus 1802 or other communication mechanism for communicating information, and a hardware processor 1804 coupled with bus 1802 for processing information. Hardware processor 1804 may be, for example, a general purpose microprocessor.

Computer system 1800 also includes a main memory 1806, such as a random access memory (RAM) or other dynamic storage device, coupled to bus 1802 for storing information and instructions to be executed by processor 1804. Main memory 1806 also may be used for storing temporary variables or other intermediate information during execution of instructions to be executed by processor 1804. Such instructions, when stored in non-transitory storage media accessible to processor 1804, render computer system 1800 into a special-purpose machine that is customized to perform the operations specified in the instructions.

Computer system 1800 further includes a read only memory (ROM) 1808 or other static storage device coupled to bus 1802 for storing static information and instructions for processor 1804. A storage device 1810, such as a magnetic disk, optical disk, or solid-state drive is provided and coupled to bus 1802 for storing information and instructions.

Computer system 1800 may be coupled via bus 1802 to a display 1812, such as a cathode ray tube (CRT), for displaying information to a computer user. An input device 1814, including alphanumeric and other keys, is coupled to bus 1802 for communicating information and command selections to processor 1804. Another type of user input device is cursor control 1816, such as a mouse, a trackball, or cursor direction keys for communicating direction information and command selections to processor 1804 and for controlling cursor movement on display 1812. This input device typically has two degrees of freedom in two axes, a first axis (e.g., x) and a second axis (e.g., y), that allows the device to specify positions in a plane.

Computer system 1800 may implement the techniques described herein using customized hard-wired logic, one or more ASICs or FPGAs, firmware and/or program logic which in combination with the computer system causes or programs computer system 1800 to be a special-purpose machine. According to one embodiment, the techniques herein are performed by computer system 1800 in response to processor 1804 executing one or more sequences of one or more instructions contained in main memory 1806. Such instructions may be read into main memory 1806 from another storage medium, such as storage device 1810. Execution of the sequences of instructions contained in main memory 1806 causes processor 1804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1810. Volatile media includes dynamic memory, such as main memory 1806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1802. Transmission media can also take the form of acoustic or light waves, such as those generated during radio-wave and infra-red data communications.

Various forms of media may be involved in carrying one or more sequences of one or more instructions to processor 1804 for execution. For example, the instructions may initially be carried on a magnetic disk or solid-state drive of a remote computer. The remote computer can load the instructions into its dynamic memory and send the instructions over a telephone line using a modem. A modem local to computer system 1800 can receive the data on the telephone line and use an infra-red transmitter to convert the data to an infra-red signal. An infra-red detector can receive the data carried in the infra-red signal and appropriate circuitry can place the data on bus 1802. Bus 1802 carries the data to main memory 1806, from which processor 1804 retrieves and executes the instructions. The instructions received by main memory 1806 may optionally be stored on storage device 1810 either before or after execution by processor 1804.

Computer system 1800 also includes a communication interface 1818 coupled to bus 1802. Communication interface 1818 provides a two-way data communication coupling to a network link 1820 that is connected to a local network 1822. For example, communication interface 1818 may be an integrated services digital network (ISDN) card, cable modem, satellite modem, or a modem to provide a data communication connection to a corresponding type of telephone line. As another example, communication interface 1818 may be a local area network (LAN) card to provide a data communication connection to a compatible LAN. Wireless links may also be implemented. In any such implementation, communication interface 1818 sends and receives electrical, electromagnetic or optical signals that carry digital data streams representing various types of information.

Network link 1820 typically provides data communication through one or more networks to other data devices. For example, network link 1820 may provide a connection through local network 1822 to a host computer 1824 or to data equipment operated by an Internet Service Provider (ISP) 1826. ISP 1826 in turn provides data communication services through the world wide packet data communication network now commonly referred to as the "Internet" 1828. Local network 1822 and Internet 1828 both use electrical, electromagnetic or optical signals that carry digital data streams. The signals through the various networks and the signals on network link 1820 and through communication interface 1818, which carry the digital data to and from computer system 1800, are example forms of transmission media.

Computer system 1800 can send messages and receive data, including program code, through the network(s), network link 1820 and communication interface 1818. In the Internet example, a server 1830 might transmit a requested code for an application program through Internet 1828, ISP 1826, local network 1822 and communication interface 1818.

The received code may be executed by processor 1804 as it is received, and/or stored in storage device 1810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for automating placement of props on a digital map, comprising:
 based on one or more training maps on which props have been placed in an ideal placement, training a machine learning mechanism to output placements, on input target maps, for sets of input target props;
 receiving, as input to a prop placement tool, a target map and a set of target props;
 wherein the target map defines a set of map structures;
 for each target prop in the set of target props, executing the prop placement tool on one or more computing devices to cause the prop placement tool to automatically determine a final placement for the target prop on the target map by:
   from a set of possible placements of the target prop on the target map, the prop placement tool determining a set of valid placements for the target prop based, at least in part, on one or more spatial rules;
   for each valid placement in the set of valid placements, the prop placement tool generating a prop distribution score based on output of the machine learning mechanism;
   for each valid placement in the set of valid placements, the prop placement tool determining a placement score based, at least in part, on the prop distribution score that is generated for the valid placement;

selecting, by the prop placement tool, as the final placement for the target prop on the target map, a valid placement based on one or more placement scores generated for one or more valid placements of the target prop;

generating output, by the prop placement tool, that indicates a placement outcome that includes the final placement for each target prop in the set of target props; and based on the final placement for each target prop in the set of target props, generating a version of the target map in which the set of target props have been placed on the target map.

2. The method of claim 1 wherein selecting, as the final placement for the target prop on the target map, a valid placement based on one or more placement scores generated for one or more valid placements of the target prop, comprises:

assigning a probability to each valid placement in the set of valid placements, and sampling the valid locations according to the probability distribution.

3. The method of claim 1 wherein the one or more spatial rules includes a spatial rule that prohibits overlap between target objects and the map structures of the target map.

4. The method of claim 3 further comprising determining whether the spatial rule that prohibits overlap is satisfied for a given possible placement based on a two-dimensional top-down image of the map that is taken as of a particular height.

5. The method of claim 1 wherein the set of valid placements for the target prop are determined based, in part, on one or more prop-specific rules.

6. The method of claim 5 wherein, for a particular target prop, the set of prop-specific rules includes that a particular edge of the particular prop must be adjacent to an edge in the target map.

7. The method of claim 5 wherein, for a particular target prop, the set of prop-specific rules includes that a particular corner of the particular prop must align with a particular corner in the target map.

8. The method of claim 1 wherein generating a prop distribution score for a particular placement of a particular target prop includes generating a prop-to-fixed-object distribution score based on distances between the particular target prop in the particular placement and a plurality of fixed objects in the target map.

9. The method of claim 3 wherein generating the prop distribution score for the particular placement of the particular target prop includes generating a prop-to-prop distribution score based on distances between the particular target prop in the particular placement and one or more target props already placed in the target map.

10. The method of claim 1 wherein determining a placement score for a particular placement of a particular target prop includes determining a proximity score for the particular placement of the particular target prop based on how close the particular placement will place the particular target prop to other objects in the target map.

11. The method of claim 10 wherein the proximity score for the particular placement of the particular prop is determined using a distance transform of the target map.

12. The method of claim 10 further comprising:
establishing a sequence for determining placement scores for the target props; and
wherein the distance transform used to generate the proximity score for any given target prop is based on the target map after the target props that precede the given target prop in the sequence have been placed in their respective final placements.

13. The method of claim 12 wherein establishing the sequence is based on respective sizes of the target props, wherein placement scores for larger target props are determined before placement scores for smaller props.

14. The method of claim 1 further comprising:
creating a heat map by tracking where player characters move through the target map during one or more play sessions;
wherein the one or more spatial rules includes a rule that is based on the heat map.

15. One or more non-transitory computer-readable media storing instructions for automating placement of props on a digital map, the instructions comprising instructions which, when executed by one or more computing devices, cause:

based on one or more training maps on which props have been placed in an ideal placement, training a machine learning mechanism to output placements, on input target maps, for sets of input target props;

receiving, as input to a prop placement tool, a target map and a set of target props;

wherein the target map defines a set of map structures;

for each target prop in the set of target props, executing the prop placement tool on one or more computing devices to cause the prop placement tool to automatically determine a final placement for the target prop on the target map by:

from a set of possible placements of the target prop on the target map, the prop placement tool determining a set of valid placements for the target prop based, at least in part, on one or more spatial rules;

for each valid placement in the set of valid placements, the prop placement tool generating a prop distribution score based on output of the machine learning mechanism;

for each valid placement in the set of valid placements, the prop placement tool determining a placement score based, at least in part, on the prop distribution score that is generated for the valid placement;

selecting, by the prop placement tool, as the final placement for the target prop on the target map, a valid placement based on one or more placement scores generated for one or more valid placements of the target prop;

generating output, by the prop placement tool, that indicates a placement outcome that includes the final placement for each target prop in the set of target props; and based on the final placement for each target prop in the set of target props, generating a version of the target map in which the set of target props have been placed on the target map.

16. The one or more non-transitory computer-readable media of claim 15 wherein selecting, as the final placement for the target prop on the target map, a valid placement based on one or more placement scores generated for one or more valid placements of the target prop, comprises:

assigning a probability to each valid placement in the set of valid placements, and sampling the valid locations according to the probability distribution.

17. The one or more non-transitory computer-readable media of claim 15 wherein the one or more spatial rules includes a spatial rule that prohibits overlap between target objects and the map structures of the target map.

18. The one or more non-transitory computer-readable media of claim 15 wherein the set of valid placements for the target prop are determined based, in part, on one or more prop-specific rules.

19. The one or more non-transitory computer-readable media of claim 15 wherein generating a prop distribution score for a particular placement of a particular target prop includes generating a prop-to-fixed-object distribution score based on distances between the particular target prop in the particular placement and a plurality of fixed objects in the target map.

20. The one or more non-transitory computer-readable media of claim 15 further comprising instructions for:
- creating a heat map by tracking where player characters move through the target map during one or more play sessions;
- wherein the one or more spatial rules includes a rule that is based on the heat map.

* * * * *